Figure 22:
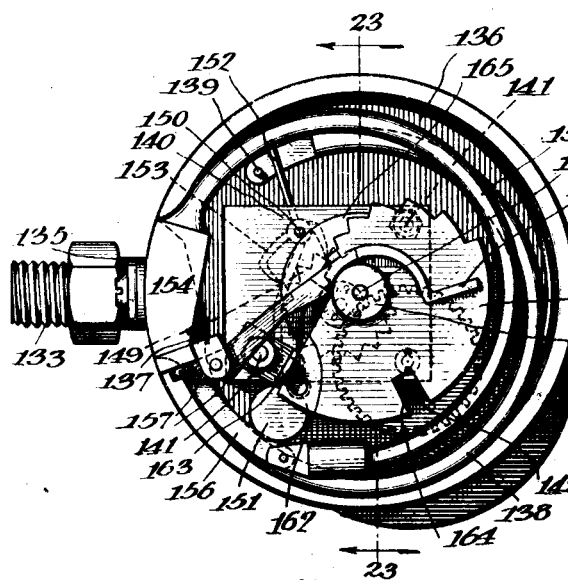

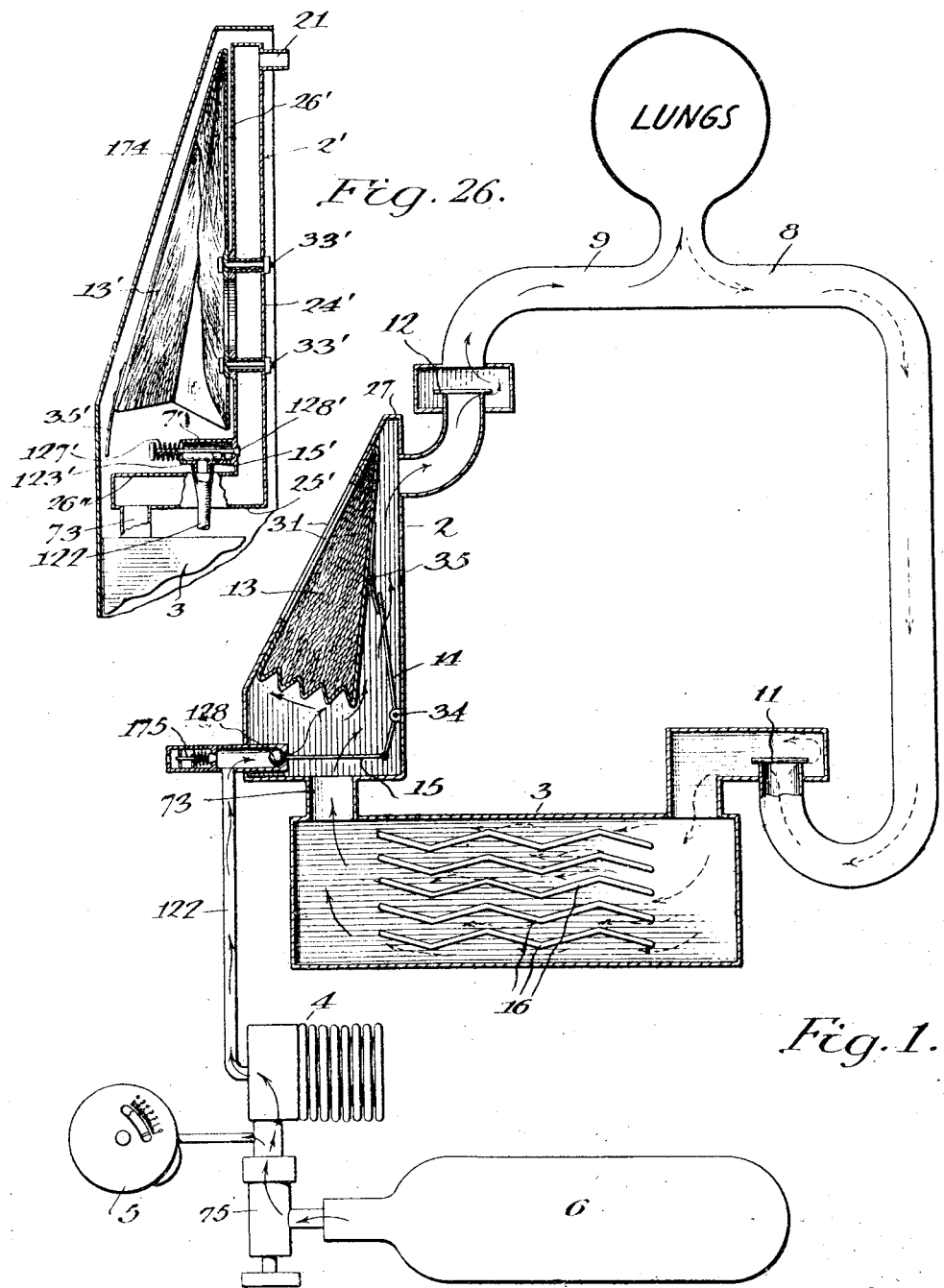

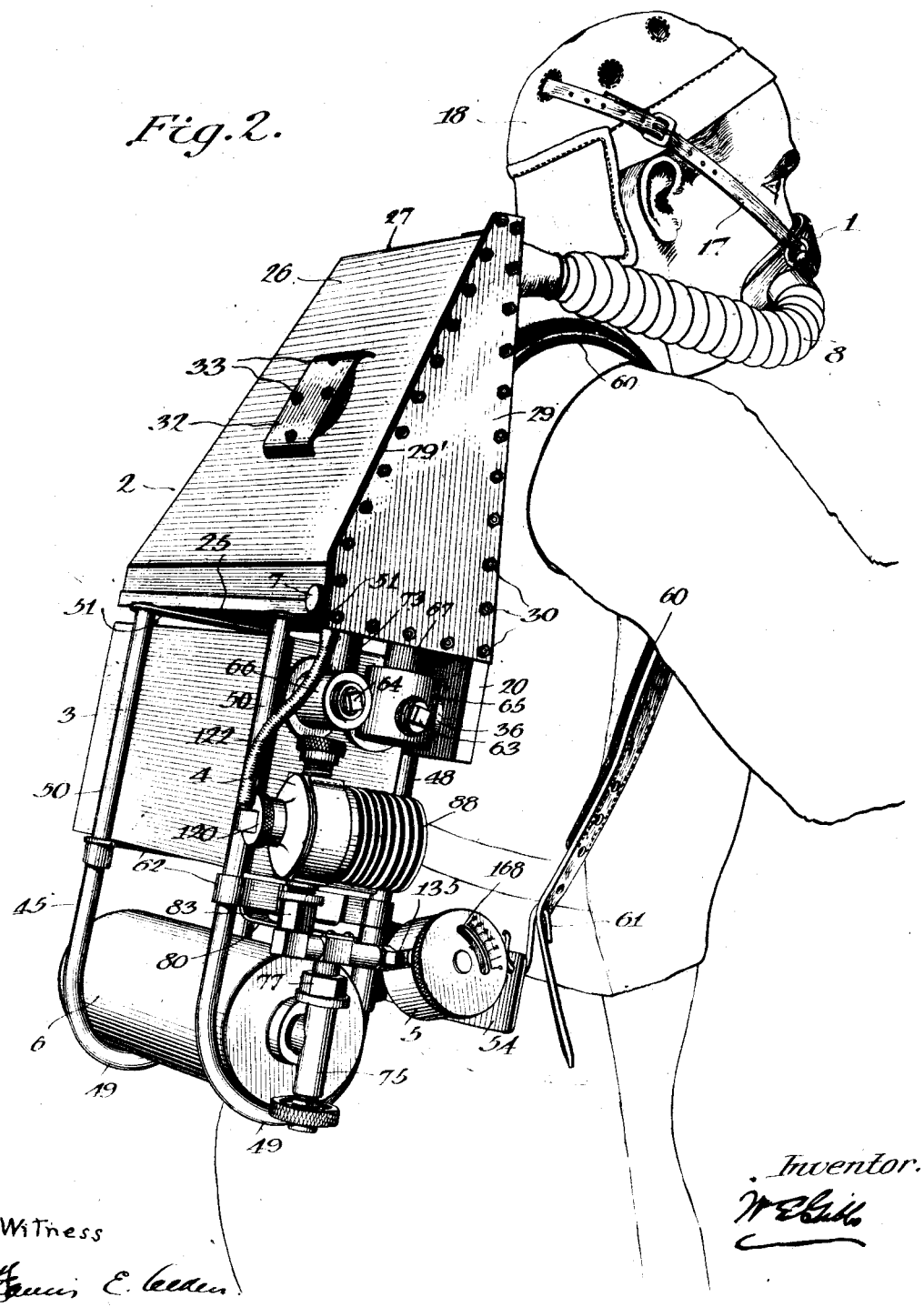

W. E. GIBBS.
MINE BREATHING APPARATUS.
APPLICATION FILED JULY 9, 1915.
1,176,711.
Patented Mar. 21, 1916.
9 SHEETS—SHEET 3
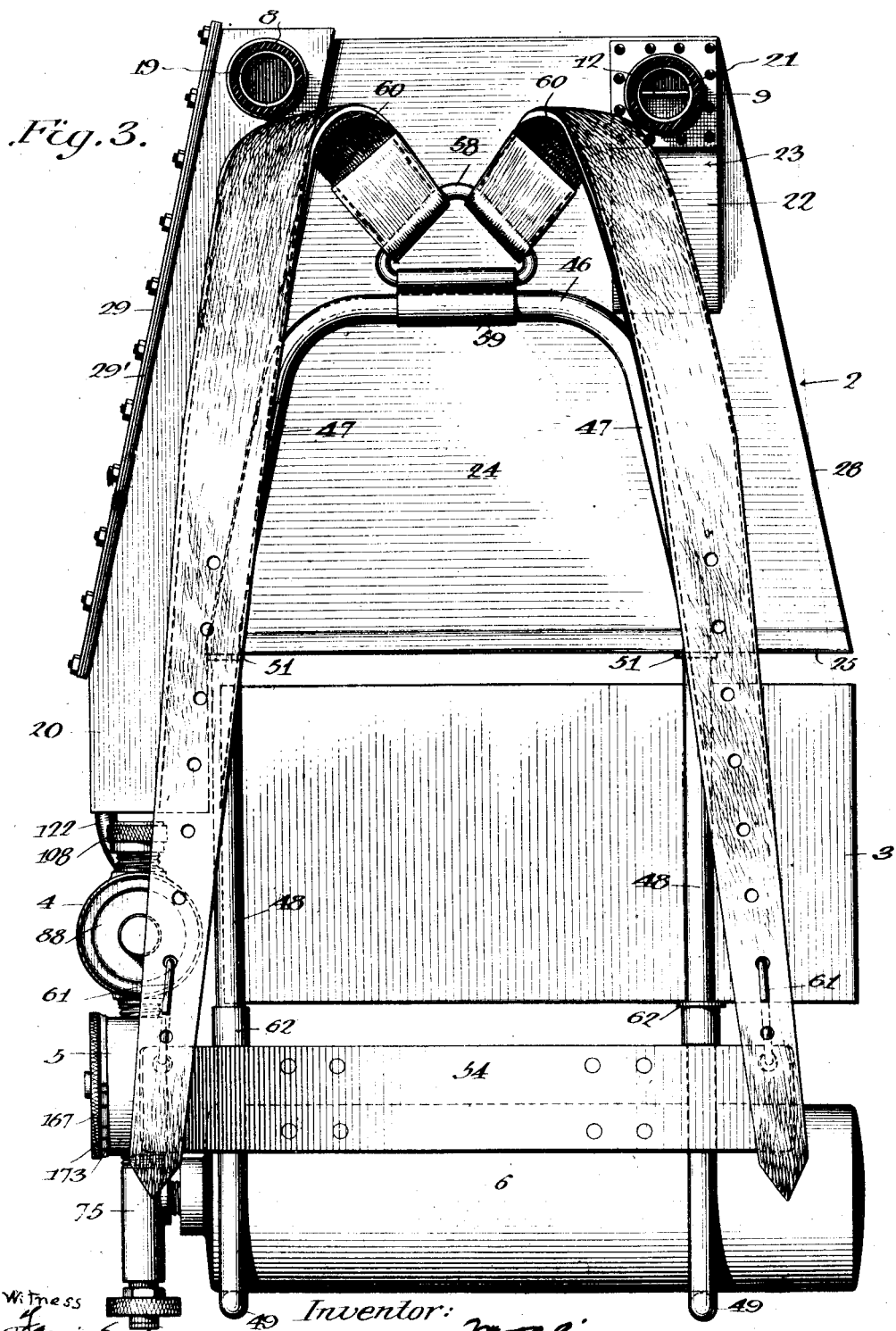

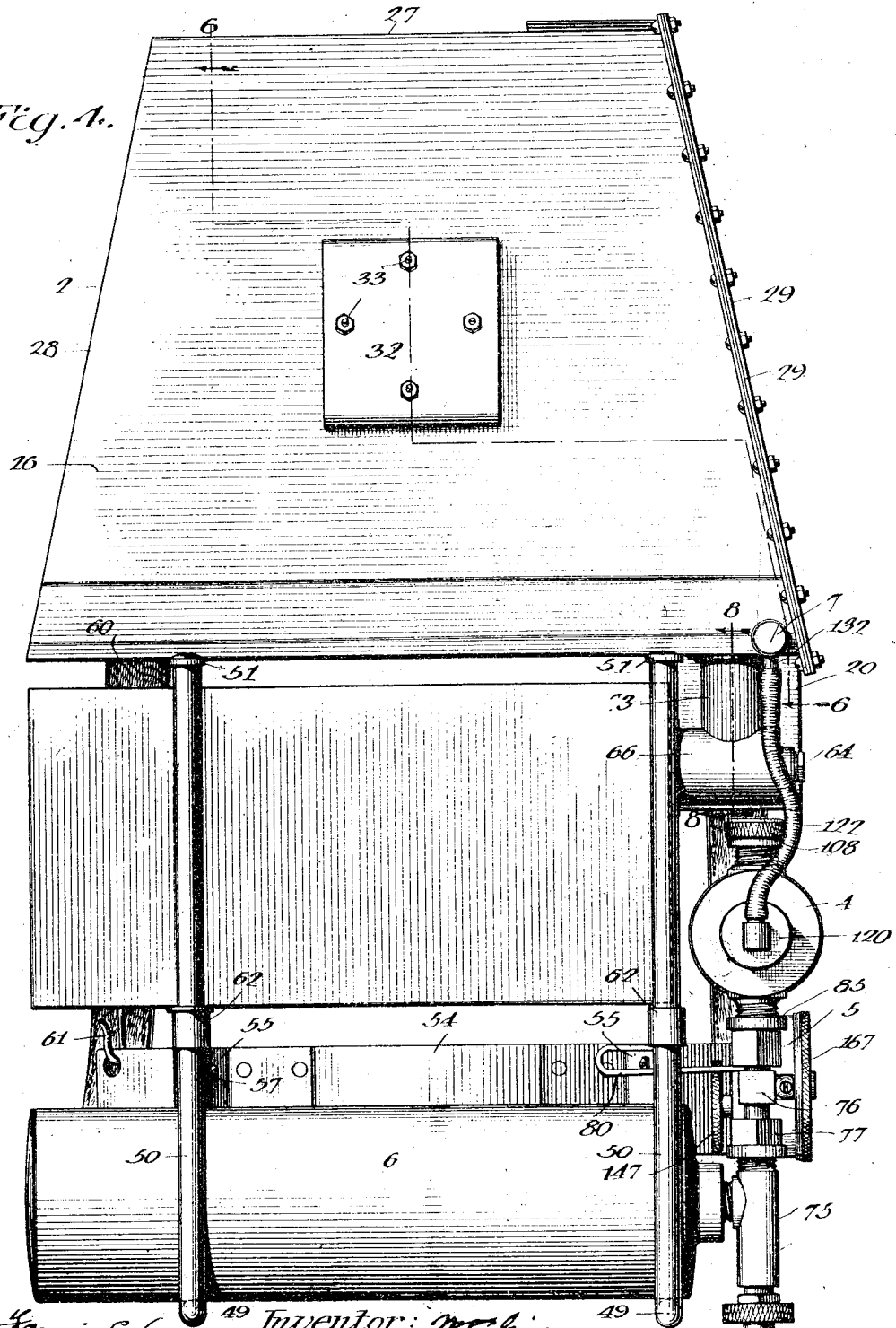

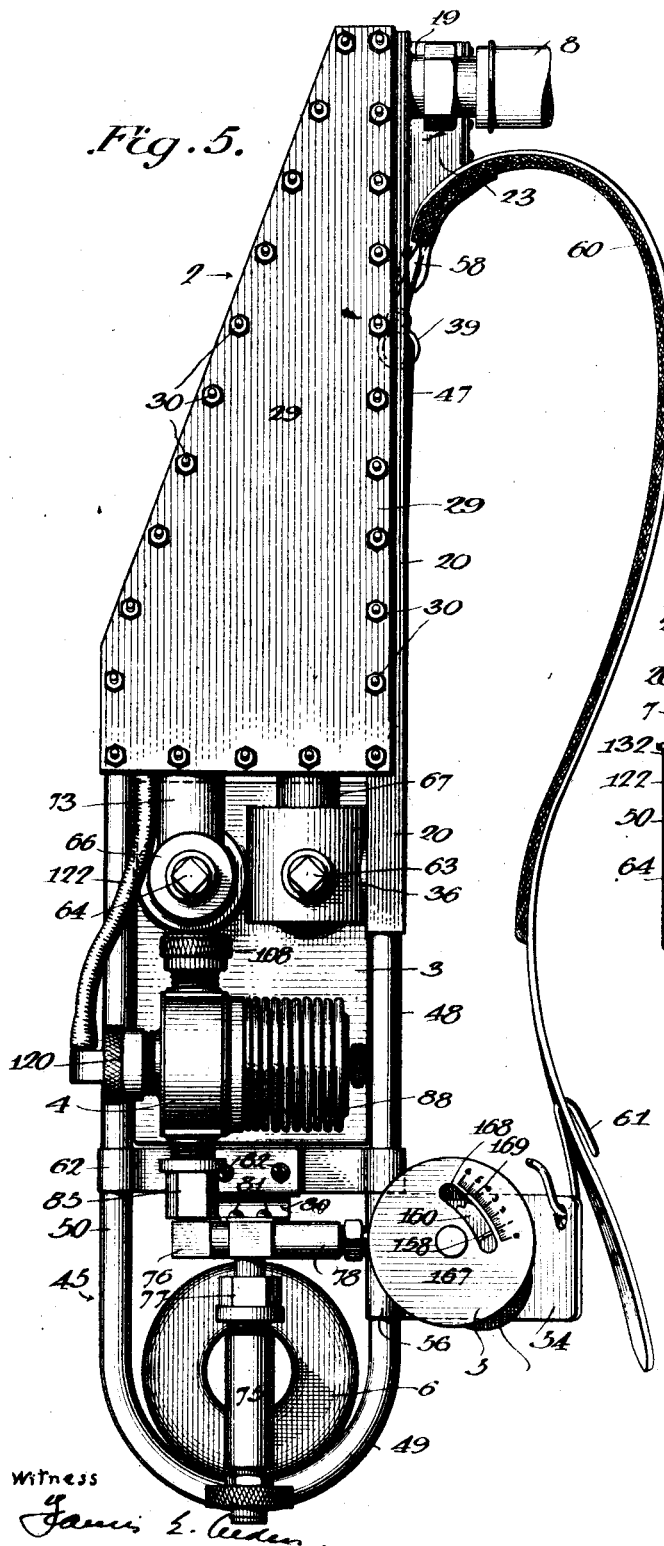

W. E. GIBBS.
MINE BREATHING APPARATUS.
APPLICATION FILED JULY 9, 1915.
1,176,711.
Patented Mar. 21, 1916.
9 SHEETS—SHEET 6.
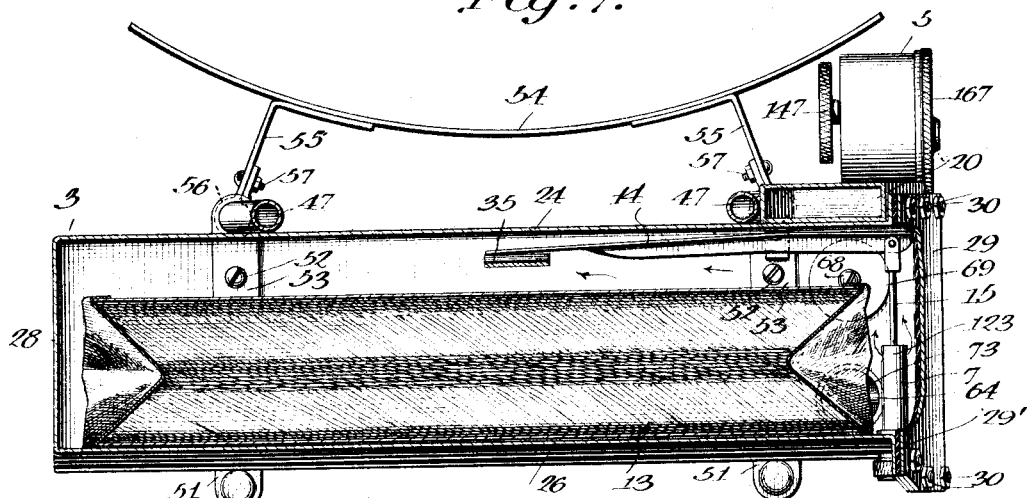
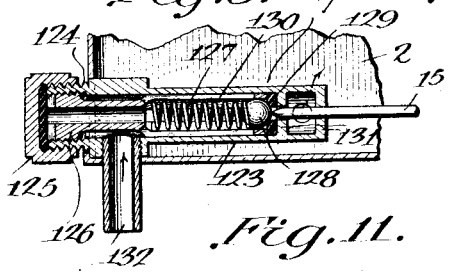
Witness
Inventor.

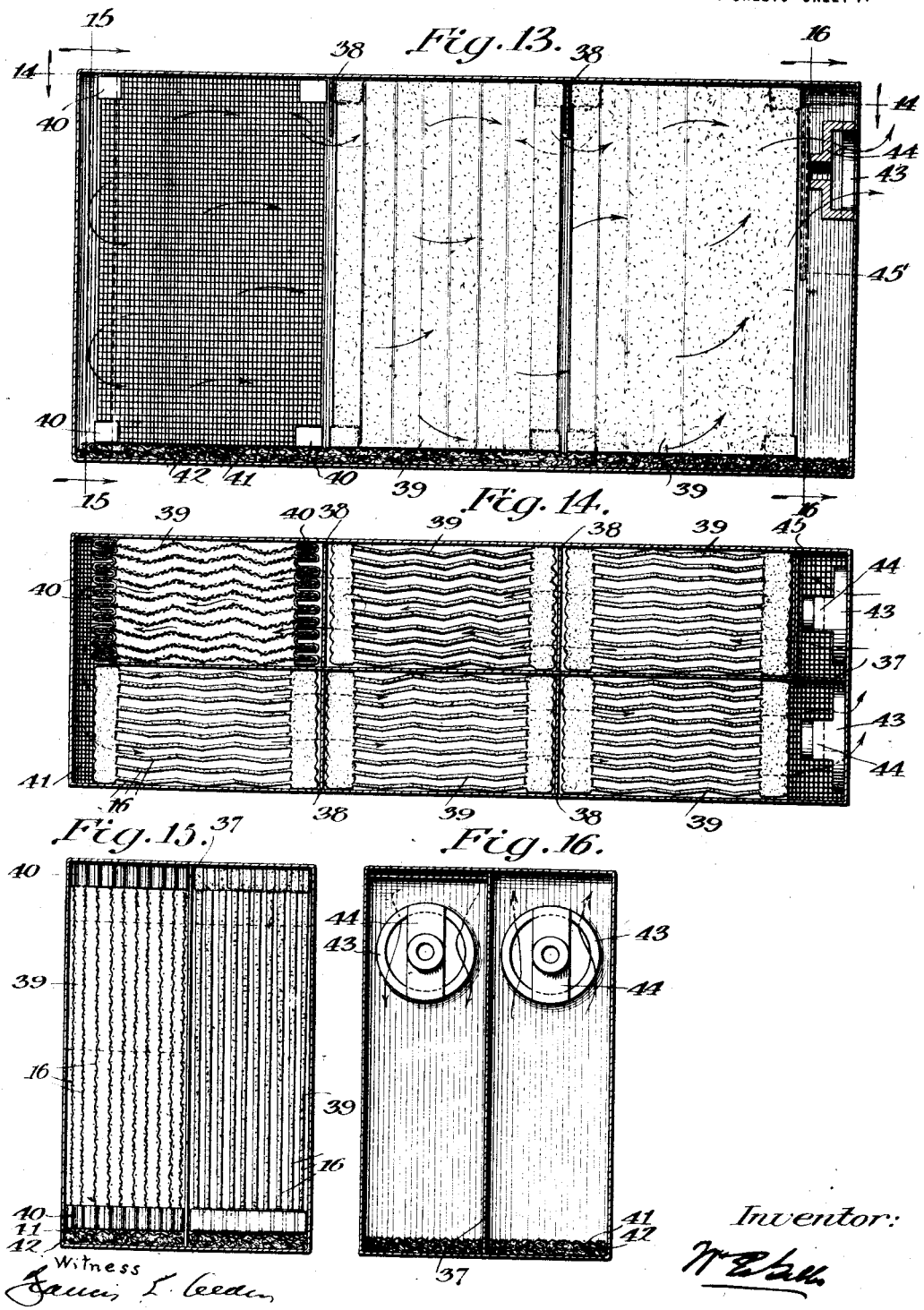

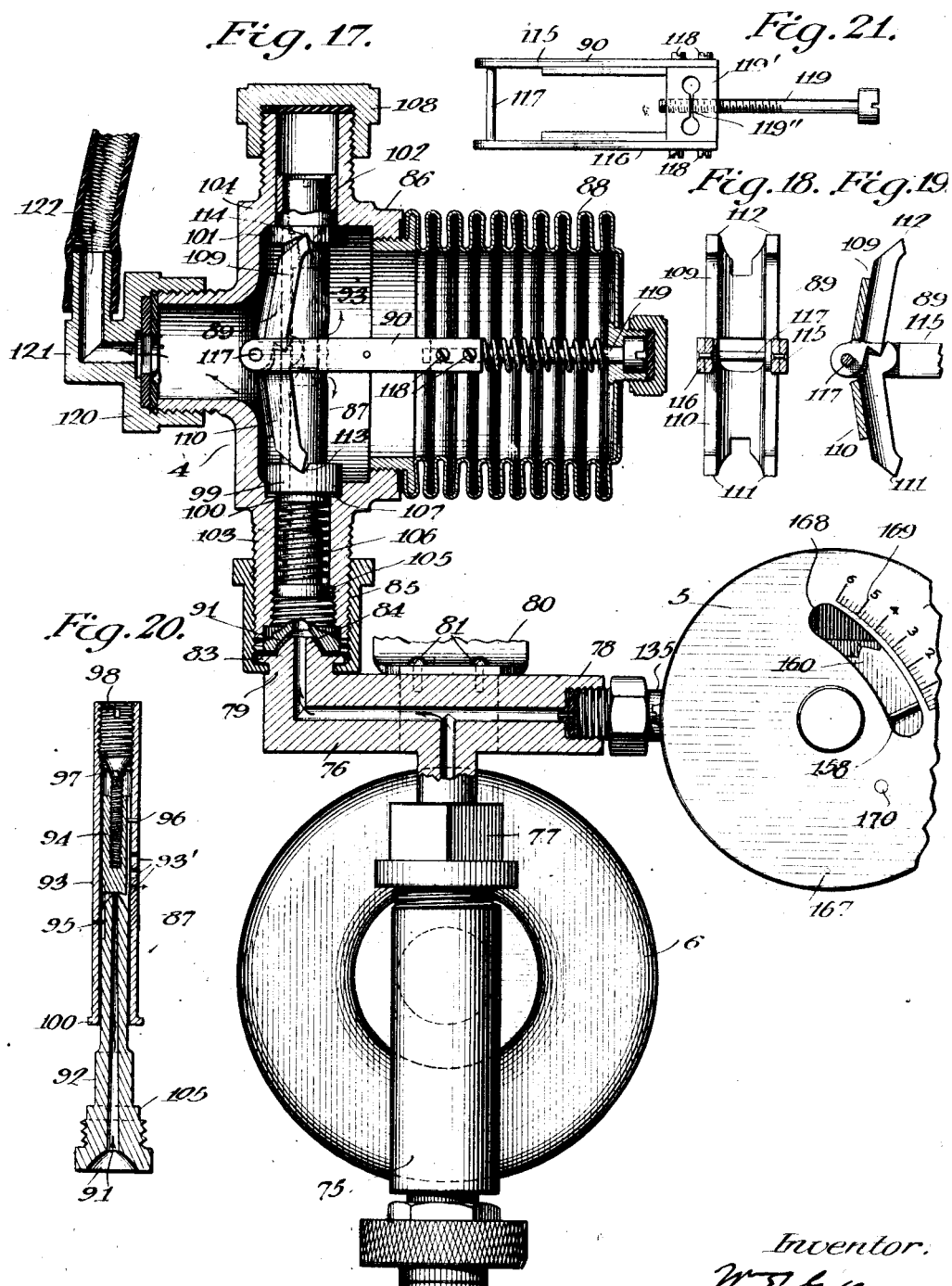

W. E. GIBBS.
MINE BREATHING APPARATUS.
APPLICATION FILED JULY 9, 1915.

1,176,711.

Patented Mar. 21, 1916.
9 SHEETS—SHEET 9.

Witness

Inventor:

UNITED STATES PATENT OFFICE.

WILLIAM E. GIBBS, OF NEW YORK, N. Y.

MINE BREATHING APPARATUS.

1,176,711.     Specification of Letters Patent.    Patented Mar. 21, 1916.

Application filed July 9, 1915. Serial No. 38,880½.

*To all whom it may concern:*

Be it known that I, WILLIAM E. GIBBS, a citizen of the United States, residing at New York, in the county of New York and State of New York, have invented a new and useful Improvement in Mine Breathing Apparatus, of which the following is a specification.

My invention relates to that class of mine-breathing apparatus which supplies an artificial atmosphere to a worker in a poisonous gas and permits the wearer to enter with safety an exploded or burning mine or other inclosure whose contents are irrespirable. Devices of this character are well known, but for one reason or another, have heretofore been unsatisfactory in use.

The object of my invention is to overcome the objectionable features in such apparatus and to produce a breathing apparatus having a maximum degree of safety with a minimum amount of discomfort to the wearer.

My complete breathing apparatus is made up of a number of interdependent devices whose coöperation determines its successful action.

Before entering into a detailed description of the separate elements which make up my breathing apparatus it may be noted that in common with other devices of its kind, it consists of a distensible chamber containing highly oxygenated air and having a tube leading to the wearer's mouth, through which he inhales and a second tube which carries the exhaled breath through a can containing caustic soda, or its equivalent, and back to the distensible chamber. Valves in the system insure a flow of the oxygenated air in one direction only. The other essential elements of the apparatus comprise a reducing valve, or pressure regulator, connected to the oxygen tank, for lowering the pressure of the oxygen to a manageable quantity, and in my particular apparatus, an oxygen admission valve which feeds oxygen of a low pressure into the system as required by the wearer, and which in turn is actuated by the movable side of said distensible chamber, and a pressure gage for indicating the quantity of oxygen available, said gage being read by touch and having an alarm which warns the wearer of the approaching exhaustion of the oxygen supply. In addition to these elements of the apparatus, there are straps and belts for supporting it upon the wearer and some form of mouth piece with tubes for conveying the highly oxygenated air to the lungs, and the carbon dioxid laden air from the lungs of the wearer.

The following elements of applicant's apparatus are considered to have special advantage over the forms of apparatus now in use: the breathing chamber, the purifying or regenerating can or receptacle, the reducing valve and the pressure gage and in addition, the fact that all of these parts are carried upon the back of the wearer, thus placing the apparatus in a position least inconvenient to the wearer. The breathing chamber is provided with metallic walls which furnish a large radiating surface, this obviating the need of a special cooling chamber.

In the purifying or regenerating apparatus now in use, the absorbing medium, such for example as caustic soda or caustic potash, is arranged in superposed layers composed of sticks, lumps or granules of said material providing a filter for the air, or said material is disposed in trays having impermeable metallic bottoms and woven wire covers, or it is disposed in flat pockets formed at both sides with permeable material, said layers, trays or pockets, being so arranged that they are successively traversed by air passing in a circuitous manner through the apparatus. Air regenerating apparatus of these types are objectionable because the granules or lumps of caustic potash coalesce more or less and also as the lumps get smaller by use, they lie more compactly together in the layer type and considerable resistance is offered to the free flow of the air, especially after having been in use for a time, or the water or carbonate that forms covers a portion of the surface of the granules in the tray type, and moreover, in all the types in which granules or sticks of caustic potash are used said lumps or sticks have a constantly decreasing surface as they waste away, so that their efficiency as an absorber of carbon dioxid gradually decreases. For this reason a considerable excess of caustic potash must be present which is undesirable, in that it adds weight to an already heavy apparatus that must be carried by a man under most unfavorable conditions.

One of the objects of my invention is to dispose the absorbing material so that its surface will remain practically constant as it is consumed, to provide free passage for the carbon dioxid past the absorbing material, and to support said material in such manner that the unused part thereof will remain securely in place until the whole is consumed.

Mine-breathing apparatus for use in irrespirable atmosphere supplies oxygen constantly to the user, while the carbon dioxid is absorbed by caustic potash or caustic soda, the nitrogen of the air with which the apparatus is initially supplied, remaining unchanged. While in the lungs, the oxygen is partly absorbed, and the remainder takes up carbon from the blood so that the exhaled air, somewhat diminished in volume, consists of carbon dioxid ($CO_2$) and oxygen, with some nitrogen. During the passage of the exhaled air through the caustic soda, the carbon dioxid is absorbed, so that by the time the distensible chamber is reached, the exhaled air is nearly free from carbon dioxid, but is considerably reduced in volume. Oxygen, from a tank of compressed gas, is supplied to the system to compensate the loss mentioned above, and keeps the volume of air in the system practically constant. It is found advisable to have the atmosphere in the system very rich in oxygen when the wearer starts to use the apparatus, because much of the commercial oxygen is manufactured by fractional distillation from liquefied air and contains a small percentage of nitrogen. Since the nitrogen is not changed by the process of breathing, it accumulates in the apparatus and might eventually form so large a proportion of the air in the system that the mixture would not support life. No harm or discomfort follows the use of pure oxygen in apparatus of this kind.

My invention provides for coating thin wire gauze sheets with fused caustic soda or other suitable carbon dioxid absorbing material so that said sheets support and strengthen the plates while in use. Several such plates are placed vertically and parallel to each other in the path of the carbon dioxid which is to be absorbed, said plates being spaced a sufficient distance apart to permit the free flow of the expired air therebetween.

My complete breathing apparatus is made up of a number of interdependent devices whose cooperation determines its successful action, and in which the invention consists in the construction, combination and arrangement of the several parts of the apparatus, as will be hereinafter more fully described, and particularly pointed out in the claims which are appended hereto and form a part of this application.

Figure 23:
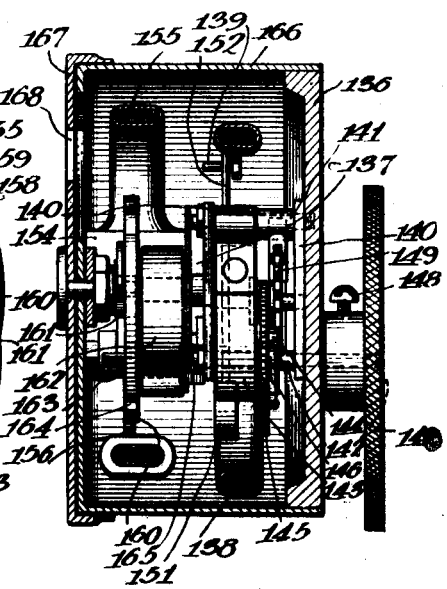
Figure 24:
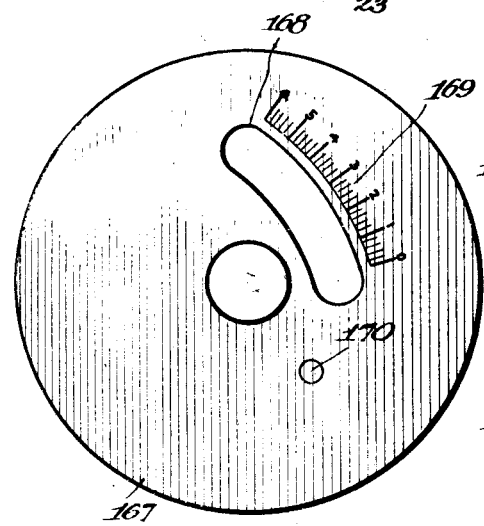
Figure 25:
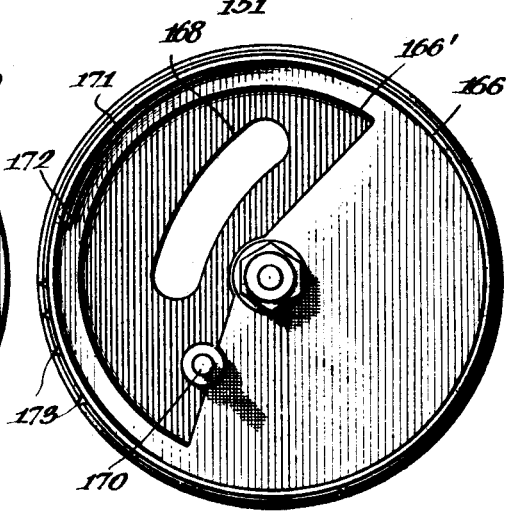

In describing my invention in detail, reference will be had to the accompanying drawings wherein like characters designate like parts throughout the several views, and in which:

Figure 1 is diagrammatic illustration of the flow of oxygen and air through the apparatus and lungs. Fig. 2 is a perspective view of the apparatus in position on the wearer ready for actual use. Fig. 3 is a front elevation. Fig. 4 is a rear elevation. Fig. 5 is an elevation of the right side of the apparatus. Fig. 6 is a section of the line 6—6 of Fig. 4, the lower part of the apparatus being broken away. Fig. 7 is a horizontal section through the distensible breathing chamber and bellows on line 7—7 of Fig. 6. Fig. 8 is a vertical section on line 8—8 of Fig. 4. Fig. 9 is a section on line 9—9 of Fig. 8. Fig. 10 is a section on line 10—10 of Fig. 8. Fig. 11 is a longitudinal section of the admission valve. Fig. 12 is an elevation of the lever which opens the admission valve. Fig. 13 is a vertical longitudinal section of the air purifying or regenerating chamber. Fig. 14 is a horizontal longitudinal section of the purifying chamber on line 14—14 of Fig. 13. Fig. 15 is a section on line 15—15 of Fig. 13. Fig. 16 is a section on line 16—16 of Fig. 13. Fig. 17 is a vertical section through the pressure regulator or reducing valve and tube leading to the pressure gage. Figs. 18 and 19 show sectional details of the toggle member 89. Fig. 20 is a longitudinal section of the valve 93. Fig. 21 is a plan view of the rod 90. Fig 22 is an elevation of the pressure gage, the casing being removed. Fig. 23 is a section on line 23—23 of Fig. 22. Fig. 24 is an elevation of the front of the gage. Fig. 25 is an elevation of the rear of the pressure gage cap and casing. Fig. 26 is a section of an alternate form of breathing chamber.

In order to facilitate the understanding of the detailed description of the apparatus an explanation of the diagrammatic scheme of the apparatus as shown in Fig. 1 is inserted at this point.

The principal members of the apparatus are the mouth piece 1, Fig. 2, breathing and cooling chambers 2, comprising a distensible chamber having one side formed with a bellows 13, an absorbing can 3 containing plates of caustic soda or other absorbing material for carbon dioxid, a pressure reducer 4, a pressure indicator 5, an oxygen tank 6, an admission valve 7, normally held shut by a spring and opened by a lever 14, and push rod 15. The mouth piece has two tubes 8 and 9 leading to the absorbent chamber 3 and the breathing chamber 2, respectively. In these tubes are two check valves 11 and 12 opening in the direction indicated by the arrows. When the wearer's lungs are contracted during expiration, air passes from them through the tube 8, lifts the valve 11, passes between the plates 16, on which the absorber of carbon dioxid is supported, where said carbon dioxid is removed from it. The remainder of the air then passes into the chamber 2 where the bellows 13 yields in the direction of the arrow to make room for it. During expiration the valve 12 remains closed. Upon inspiration, the valve 12 opens and the purified air passes from chamber 2 to the lungs, the bellows 13 expanding as the air leaves the chamber. The purified air which returns to the chamber 2 will be less in volume than that previously drawn out of it on inspiration, by the amount that is changed into water in the lungs of the wearer, and the amount that as carbon dioxid is absorbed by the material on the plates 16. After a few breaths, the number depending on the amount of work that the wearer of the apparatus is doing, the bellows 13 expands sufficiently to move the lever 14 and the push rod 15 to open the oxygen admission valve 7. Oxygen enters the chamber 2 driving the bellows 13 before it until the loss in volume is restored, whereupon the bellows leaves the lever 14 and the admission valve automatically closes. This intermittent oxygen feed is made possible by the perfection of the reducing valve 4 which takes the gas from the oxygen tank 6 at the pressure of about 2,000 lbs. per square inch and reduces it to a pressure of 2 lbs. per square inch at the admission valve. In the process of absorbing the carbon dioxid from the air in the can 3 the chemical reaction liberates considerable heat, so that the air which passes into chamber 2 is too hot to be breathed. The large surface of this chamber acts as such an efficient heat radiator that even under conditions of extreme labor the air which enters the lungs is comfortably cool. In order that the amount of oxygen remaining in the tank 6 may be known at any time, a pressure gage 5 is provided, which may be read by touch as well as by sight and which sounds an alarm when the oxygen supply is depleted to a point at which the wearer should return to safety. The mechanical details of the various parts and the way they are assembled into a complete apparatus are shown by the other drawings.

The mouth piece comprises a mask 1, supported by straps 17 which are attached to a skull cap 18. The tubes 8 and 9 are made of air tight corrugated elastic material and extend from the mouth-piece over the shoulders, one tube on each side, the tube on the right side being attached to a nipple 19 which projects forward from the upper portion of a vertical conduit 20 which is attached on the front face of the distensible chamber 2 at the right side thereof and extends below said chamber 2; the left tube 9 is attached to the nipple 21 which projects forward from a conduit 23 which is attached on the front face of the breathing chamber at the upper left hand corner thereof, and which extends down about a third of the vertical height of the chamber 2. The lower wall 22 of said conduit extends at an acute angle from the front wall 24. The breathing chamber is six sided, having a tapering contour, the front wall 24 being vertical and wider at the bottom than at the top. The bottom 25 is comparatively wide and the rear wall 26 ascends vertically for a short distance and then converges toward the front wall to the top wall 27 which is very narrow. The two end or side walls 28 and 29 converge toward each other from the bottom to the top. The end wall 28 and the walls 24, 25, 26 and 27 are rigidly secured together by soldering, brazing, or otherwise, but the side wall 29 is secured to a flanged edge of the chamber 2 by bolts and nuts 30, a gasket 29' being interposed between the wall and the flange. Inside the chamber is a bellows-like member 13, which moves toward the rear wall thus providing room for the wearers breath during expiration. This movable wall renders the chamber 2 equivalent to an elastic bag. The rear walls of the chamber and bellows are provided with registering openings 31 which permit the free movement of air out and in during expiration and inspiration. The opening 31 in the chamber is covered by a curved member 32 for keeping out dirt, which is secured to the rear wall by bolts and nuts 33.

The admission valve 7 is placed inside the breathing chamber in the lower right hand corner and is secured at right angles to the rear wall and comprises a cylindrical portion 123 which is provided with a nipple 124 projecting outside of said chamber. This nipple is threaded externally and internally and receives a cap 125 screwed upon the external threads and an adjustable tubular member 126 screwed into the internal threads, which compresses the spring 127 upon the ball valve 128, and also holds the leather valve-seat 129 in place. The spring is carried by an enlarged portion of the member 126 and has air passages 130 surrounding it for conveying oxygen from the tube 132 past the ball valve 128 when the latter is lifted from its seat. The casing 123 is extended beyond the valve seat 129 and ends in a pierced wall which forms a guide for the push rod 15. During inspiration the bellows automatically opens the admission valve in the following means: The lever 14 is pivoted to the front wall 24 of the chamber at 24. The short arm of the lever is pivoted to rod 15 which is carried in the axial openings in walls 131 and operates the valve 7. The long arm of the lever is pressed upon by the spring 35 which is secured to the bellows and carried forward thus moving the end of the short arm rearward and lifting the ball valve from its seat permitting the entrance of oxygen. Expired air passes from the wearer through tube 8 and conduit 20 and through tubes 36 and 36' into the purifying can or receptacle 3. A safety valve 175 is shown in connection with the admission valve but it may be applied elsewhere in the system.

The can or receptacle 3 is in practice made about 4½ inches wide, 6½ inches high and 12 inches long. A vertical partition 37 extends longitudinally through the can from one end to about half an inch from the other end. This partition is preferably soldered to one end and to the top and bottom of the can. The openings for the entrance and exit of the air are on opposite sides of this partition at the soldered end thereof. Cross pieces or braces 38 about an inch wide extend from the partition to the sides and are soldered thereto forming six subchambers. On each side of the partition 37 are placed three caustic soda carriers 39, one in each subchamber. Each of these carriers comprise a plurality of reinforcing plates or sheets 16 of corrugated wire gauze held in spaced relation by means of strips of sheet metal 40 folded into U-shaped loops. Each plate is clamped at its corners in alternate loops of the metallic pieces 40. In practice the upper end of the carrier is dipped first into fused caustic potash or caustic soda, for the reason that the dipped end retains more material than the other end and the plates become thicker at that end so that when inverted in the can the spaces between the plates at the top are narrower. The caustic soda forms an adherent deposit on the carrier. In use, the plates waste away more rapidly at the top than at the bottom. By making them wedge shaped the unequal wear is compensated and the gauzes remain covered with caustic over their entire surfaces until they are exhausted. I have found that better absorption of carbon dioxid is obtained with caustic soda which contains a considerable proportion of water than with the anhydrous salt, and I regard that mixture best, which melts at about 120° C. and boils at about 200° C. The carriers are supported at the bottom on a wire gauze 41 which rests upon a mass of absorbent material 42 which receives the dissolved caustic soda and prevents its possible entrance into the breathing tubes. The cross strips 58 prevent the air from passing over the tops of the carriers 39, causing it to pass between the plates. Within the openings at the end of the can are soldered rings 43 carrying cross bars or spiders 44 having threaded apertures center of the openings in the can. The purpose for which these spiders are provided will be described later. Within the entrance opening of the can is placed a baffle plate 45' to spread the exhaled air over the plates.

In order to provide a supply of oxygen a tank or bottle 6 is provided having a valved connection tube leading to the breathing chamber. The breathing chamber, carbon dioxid absorbent receptacle and tank and their connections are supported upon a framework 45 which comprises a hollow tube bent into a form having a horizontal portion 46, inclined portions 47, vertical descending portion 48, looped portions 49, at right angles to the plane of said portions 46, 47, and 48, and ascending portions 50 extending to about two thirds of the height of the frame. At the top of the portions 50 are horizontal cross pieces 51, each of which is rigidly secured at its ends to the top of one part 50 and to the adjacent part of portion 48. The breathing chamber is rigidly secured upon the two cross pieces 51 by means of bolts 52 and reinforcing plates 53 inside the bottom of the breathing chamber. Near the lower ends of the portions 46 is rigidly secured a plate 54 curved to fit the back of the wearer and secured to said parts 48 by means of L-shaped pieces 55 which are riveted to plate 54 and secured to the rod 48 by loops 56 whose ends are bolted to the main portion at 57. Upon the portion 46 of the frame is pivoted a triangular member 58 by means of a sleeve 59 which is clamped to rod 46 and received loosely one side of the triangular member. Upon each of the other two sides of said member a strap is secured by a stitched loop. On the lower side of each of said straps is secured a pad 60 to render the strap more comfortable to the wearer. These straps are perforated adjacent the ends and receive one end of a double ended hook 61, the other end of which is hooked into a perforation in the member 54. Two cross pieces 62 are rigidly secured to the frame about midway between the strips 51 and looped ends 49 and parallel to said cross pieces 51.

The purifying receptacle 3 is set in the frame between the cross pieces 51 and 62 and is held securely therein by means of bolts 63 and 64 which pass through casings 65 and 66, respectively, the threaded end of said bolts being screwed into the spiders 45. Casing 65 is cylindrical and is secured to the conduit 20 by a tube 36, which permits the entrance of air into the casing 65 on its way to the absorbent can 3. Casing 65 is rigidly secured to chamber 2 by means of a closed tube 67 through which passes a bolt 68 which engages a threaded perforation in . The lower wall 25 of chamber 3 a plate 69 upon which the head of the bolt rests. The casing 65 has an opening on one side equal in size to the opening in the can 3. Opposite this opening is a perforated reinforce in axial alinement with the spider 44. Within casing 65 is a tubular casing 70, concentric with casing 65, whose lower end is soldered to the lower wall of casing 65. A small open ended tube 71 in axial alinement with the perforation in the spider is soldered into casing 70 providing a passage way and guiding member for bolt 63. The tube 36 is soldered in open communication with casing 70 which is air tight except for the valve 11 which is raised by expired air and prevents said air from being re-breathed without passing through the purifying can. Casing 66 and tube 73 are T-shaped when taken together and form a passage way from the purifying can to the breathing chamber. Casing 66 is axially alined with the aperture in the spider 44 and has a flanged opening at one end and a perforated reinforced portion at the other end in axial alinement with the perforation in the spider. Gaskets 74 are placed between casing 65 and 66 and the receptacle 3.

The oxygen tank is supported in the lower end of the framework 49 and has the usual valve casing 75 at one end. This valve casing is connected with a T-shaped tube 76 by the usual connection 77. At one end 78 of the T-shaped tube is attached the pressure gage and alarm. At the other end of said tube an extension 79 at right angles to the horizontal part of the tube projects upward and connects with the pressure regulator 4. The T-shaped tube is connected to the frame by means of a spring member 80 which is secured to said tube by screws 81 and to the cross piece 62 of the framework by means of screws 82.

The pressure regulator comprises a cylindrical casing 86, a valve 87, a bellows diaphragm 88, a toggle member 89 and adjustable yoke 90. The extension 79 has a collar 83 and a conical end 84 which fits into a conical depression 91 in the end of the valve member or nipple 92, where it bears upon a washer of copper to make an airtight joint. The other members of this valve are the sleeve 93 and valve closure plug 94. A pin and spline 95 prevents the sleeve from rotating on nipple 92. A pin and spline 96 also prevents valve plug 94 from rotating in sleeve 93. The plug 94 is rendered adjustable by a screw 97 which forms an integral part of the screw plug 98, but has a finer thread, so that the whole forms a differential screw permitting fine adjustment of the plug valve 94 in relation to its seat when the plug 98 is screwed into the sleeve 93. The sleeve 93 is provided with openings 93'. A collar 99 is fitted upon the sleeve 93 and bears upon a flange 100. The upper end of sleeve 93 is slidingly received in a collar 101 which has an extension 102. The lower end of the valve member is screwed into the boss 103 and has a shoulder 105 upon which is mounted a spring 106 which presses against the lower flanged end of sleeve 93. Diametrically opposite boss 103 is boss 104 which has a removable cap 108 which gives access to the upper end of the valve. The sleeve 102 is held in the boss the collar 101 being held firmly against the inner portion of the casing 86 by means of the toggle 89. The toggle comprises two members 109 and 110 the lower and upper ends of which have knife edges 111 and 112 which engage with notches 113 and 114 in the collars 99 and 101 respectively.

The yoke 90 comprises two plates 115 and 116 and rod 119. The plates are pivotally secured at one end to the lower end of member 109 of the toggle by means of the pin 117. Their other ends are rigidly secured to a block 119' by means of screws 118. The headed rod 119 screws into said block, providing for adjustment in the length of the bar. The block 119' is perforated vertically near each end and these perforations are joined by a slit 119". The threaded perforation which receives the threaded end of rod 119 is so threaded that the two portions of the thread act as a lock upon the screw of said rod. This may be done by threading the block while it is under lateral compression. On the end of the cylindrical casing opposite the diaphragm is the outlet nipple on which is secured a connection 120 having a right angled nipple 121 to which is attached a flexible tube 122 leading to the admission valve 7 which is secured upon a nipple 132.

The pressure gage 5 is secured to the end 78 of the T-tube 76 by means of the threaded nipple 133 which is provided with an enlarged nut like portion to facilitate the attachment of the gage to said T-tube. Nipple 133 is integrally and rigidly secured to a projection 135 integrally secured to the base portion 136 of the gage. Upon the projection 135 is secured the base portion 137 of a Bourdon tube 138 which carries at its end a pin 139 which acts as a stop for the alarm portion of the gage. The frame work for the alarm comprises two square plates 140 held in spaced relation by two bolts 141. These bolts have threaded ends which screw into the circular base 136 of said base. Extending through the base 136 is a rod 142 to which is rigidly secured one end of the spring 143 which actuates the alarm the other end being secured to one of the bolts 141. Said rod carries a wheel 144 rigidly secured thereon and a gear wheel 145 loosely mounted thereon to turn in one direction. Wheel 145 carries a pawl 146 which coacts with the notches on wheel 144. A milled disk 147 is secured to the outer end of rod 142 by the set screw 148. Rotating said disk to the left winds up the alarm. The wheel 145 is connected with transmission gearing, the last member which is the escapement wheel 149. Mounted between the plates 140 is a pivot rod 150 which carries the hammer 151, pin 152 and escapement anchor 153. When there is a sufficient predetermined pressure in the Bourdon tube it tends to straighten and the pin 139 contacts with pin 152 and prevents by means of the anchor 153 any rotation of the escapement wheel 149 and allows the spring 143 to be wound up, but as soon as the pressure within the Bourdon tube is sufficiently reduced pin 152 is freed from pin 139 and the alarm rings, thus notifying the wearer that it is time to return to safety.

Rigidly secured to the base 137, is a second base 154, to which is secured a second Bourdon tube 155. At the free end of the Bourdon tube is pivotally secured a curved link 156, which is pivoted to the short arm of a lever 157. Upon the long arm of lever 157 is rigidly secured a pointer 158. Pivotally mounted upon a stud 159, is a snail provided with a reinforcing disk 161. A spring 162 is secured at one end upon said stud in the rear of the snail, and the other end is secured to a pin on the rear side of the snail. The spring tends to turn the snail to the right, said movement being limited by a stop 163 bolted upon the end of a bolt 141. Upon one edge of the snail are notches spaced equal radial distances from each other against which the pawl 157 engages. In the circumferentially curved edge of the snail is a notch 164. The spring is confined between the snail and a guard disk 165. A cylindrical casing 166 fitting over the base 136 and secured thereto by screws incloses said Bourdon tubes and their accessory parts. The casing 166 has a large opening 166'. Upon the front face of casing 166 is pivotally mounted a flanged disk 167 which fits over the front of the casing like a cap. This disk is provided with a curved sight opening 168 adjacent the convex edge of which is engraved a graduated scale 169. Said sight opening is provided for the observation of the pointer 158. When the oxygen pressure is high the straightening of the Bourdon tube 155 will pull upon the short arm of the lever and throw the pointer to the upper portion of the sight opening and the pressure may be read upon the scale 169 the graduations of which indicate relative pressure inside the tank. The front disk 167 carries a stud 170 which projects inwardly and engages notch 164 in the snail. A shoulder on the lever 157 engages the notches on the snail and limits the rotation of the disk 167 according to the pressure in the oxygen tank. When there is a high pressure in the tank the long arm of the lever is moved to its outermost position then the snail may be moved to the farther limit of its rotation before a notch strikes the shoulder of the lever. The long lever stands at its outermost position away from the snail until the reduction in the oxygen pressure takes place, when movement of the lever takes place in direct proportion to the reduction in pressure.

Mounted on the interior of the cylindrical portion of the casing 166 immediately adjacent the front face is a spring 171 which carries a wedge pointed finger or pin 172 which projects through an opening in the casing and engages notches 173 on the interior of the flange or disk 167. These notches 173 are adjusted to correspond with the notches in the snail 160. The wearer may ascertain the relative pressure by rotating the disk 167 when the pin 172 will click as it drops into the notches 173 and will also produce a percussive vibration and an intermission of motion which may be readily perceived by touch. While the wearer can not ascertain the pressure within the tank by visually reading the indication on the scale, yet this means of ascertaining the pressure has its utility in that companions may thus readily ascertain the oxygen pressure and tell the wearer.

An alternate form of breathing chamber is illustrated in Fig. 26. In this form the bellows is placed on the outside of the rigid breathing chamber and this necessitates some modification in the structure of the breathing chamber. The front wall 24' and bottom wall 25' of chamber 2' are of substantially the same shape and size as in chamber 2 described above. The rear wall 26' is parallel with the front wall 24' and the wall 26'' which is really a portion of the rear wall, is parallel with the bottom wall 25'. In the angle formed by walls 26' and 26'' the bellows 13' is placed, being secured to the rigid portion of the chamber by means of bolts 33' which pass through the walls 24' and 26' and the front wall of the bellows 13'. The bellows carries a projecting finger 35' which, as the bellows is deflated, strikes a rod 15' which opens the admission valve 7'. The admission valve 7' is placed outside of the chamber 2' and the valve actuating rod 15' traverses the entire length of the casing 123'. The valve 128' is held on its seat by a spring 127'. The breathing chamber is provided with a rigid protecting cover 174, which is carried down over the absorbing can and reducing valve. Said cover 174 being detachable, may be left off the apparatus when desired.

Having thus described my invention, I claim as new, and desire to secure by Letters Patent:—

1. In an apparatus of the class described, a plate consisting of a reinforce and caustic soda deposited upon said reinforce.

2. In a carbon dioxid absorbing device a reinforce, caustic soda or other carbon dioxid absorbing material deposited upon said reinforce and means for retaining said plate in spaced relation with other plates.

3. In a carbon dioxid absorbing device a frame consisting of a series of plates or sheets held in spaced relation to each other and having a coating of solid carbon dioxid absorber deposited upon said plates, and an absorbent material beneath said plates.

4. In a carbon dioxid absorbing device a frame consisting of a series of reticulated sheets held in spaced relation to each other and having a coating of caustic soda or equivalent material deposited upon said sheets, and an absorbent material arranged to receive the drainage from said plates.

5. In a carbon dioxid absorbing device, a frame consisting of a series of corrugated reticulated sheets held in rigid spaced relation to each other and having a coating of caustic soda or equivalent material deposited upon said sheets.

6. In an apparatus of the class described the combination with a casing having means for directing a current of air therethrough, of reinforcing plates or sheets having caustic soda deposited thereon and spaced apart to permit the passage of air therebetween.

7. In an apparatus of the class described, the combination of a receptacle having a partition which divides the receptacle into two compartments throughout the major portion of said receptacle, and a plurality of reinforced sheets of caustic soda placed upon each side of said partition.

8. In an apparatus of the class described, the combination of a receptacle having an inlet opening and an outlet opening in one end of said receptacle, of a partition which divides the receptacle into two compartments throughout the major portion of said receptacle, and a plurality of spaced reinforced sheets or plates of caustic soda placed upon each side of said partition in the pathway of the exhaled air passing from the inlet to the outlet of said receptacle.

9. In an apparatus of the class described, the combination with a casing having a partition reaching from one end of said casing to a point adjacent the opposite end of said casing, of a plurality of sheets provided with an adherent deposit of caustic soda or potash and placed in the pathway of the exhaled air passing from the inlet around the end of said partition to the outlet of said receptacle.

10. A mine breathing apparatus comprising a horizontally arranged purifying receptacle, a breathing chamber immediately above said receptacle, connections communicating with the outlet end of said receptacle and with the corresponding end of said breathing chamber, and a frame rigidly uniting said parts.

11. A mine breathing apparatus comprising a horizontally arranged oxygen tank, a purifying receptacle immediately above said tank, connections communicating with the outlet end of the tank and with the corresponding end of the receptacle, a breathing chamber having connections with said tank and receptacle and a frame rigidly uniting said parts.

12. A mine breathing apparatus comprising a horizontally arranged oxygen tank, a purifying receptacle immediately above said tank, connections communicating with the outlet end of the tank and with the corresponding end of the receptacle, a breathing chamber immediately above said receptacle, connections between the outlet end of the receptacle and the corresponding end of the breathing chamber, and a frame rigidly uniting said parts.

13. In a mine breathing apparatus, a purifying receptacle, a breathing chamber having two inlet ports and one outlet port and distensible walls and a detachable protecting cover therefor.

14. A mine breathing apparatus comprising a breathing chamber, a purifying receptacle and an oxygen tank arranged in the same vertical plane and in parallel relation, a pressure regulator and a pressure gage at the corresponding ends of said receptacle and tank and beneath the projecting end of said breathing chamber and a frame rigidly uniting said parts, effecting a compact arrangement of all the elements of the combined structure.

15. In a mine breathing apparatus, a chamber comprising rigid walls, the rear wall having a distensible member mounted thereon and in communication with said chamber, whereby the capacity of said chamber readily conforms to the wearer's respiratory efforts.

16. In a mine breathing apparatus a breathing chamber having rigid walls, the rear wall having a distensible member mounted thereon, said chamber having an opening communicating with the interior of the distensible member, thus providing a chamber of variable capacity which freely conforms to the wearer's respiration.

17. In a mine breathing apparatus a breathing chamber having rigid walls, the rear wall having a bellows mounted thereon, the rear wall of the chamber and the adjacent wall of the bellows having registering openings thus providing a chamber of variable capacity, an admission valve for oxygen and a lever secured to the chamber, having a rod connected therewith, which coöperates with the admission valve to permit the entrance of oxygen into the chamber.

18. In a mine breathing apparatus the combination with a mask or mouthpiece, of an air purifying receptacle, a distensible breathing chamber having metallic walls which act as a cooler of the purified air and ducts suitably connected to said parts to produce a respiratory system.

19. In a mine breathing apparatus the combination with a mask or mouthpiece of a breathing chamber, an air purifying receptacle, and ducts suitably connecting said parts to produce an inhalation and exhalation breathing system, said breathing chamber having metallic walls which act as a cooler for the purified air.

20. In a mine breathing apparatus the combination with a mask or mouthpiece of an air purifying can or receptacle, a breathing chamber, having metallic walls which act as a cooler of the purified air, a tank containing oxygen under pressure, a pressure gage comprising touch and auditory indicating means, a pressure regulator permitting great reduction in pressure of the oxygen, ducts suitably connecting said parts to produce a complete breathing system.

21. In a mine breathing apparatus, the combination of touch and auditory indicating means comprising a casing, a Bourdon tube linked to a lever which carries on one end, a pointer which coacts with a scale on the casing, said casing also carrying a spring and finger which coacts with notches on a cap which is rotatable upon the casing bringing the notches successively into coaction with the said finger producing a click and an intermission of motion.

22. In a mine breathing apparatus, a pressure regulator comprising a main cylindrical portion having an aperture and a bellows diaphragm closing said aperture, said main portion having two bosses diametrically opposed to each other, said bosses having alining longitudinal openings, a valve member consisting of an inlet nipple in threaded engagement with one boss and a sleeve carrying a valve closure, said sleeve being loosely mounted in the other boss, a toggle lever having knife edges which bear at one end against a flange on the sleeve and at the other against the interior of the main portion in opposed relation to each other, a yoke connecting the toggle with the bellows diaphragm whereby the toggle may be brought into parallel relation with the valve and exert a powerful but delicately adjustable pressure upon the valve.

23. In a mine breathing apparatus, a pressure regulator comprising a main cylindrical portion having an outlet, and having an aperture and a bellows diaphragm closing said aperture, said diaphragm being coaxial with the main portion of the regulator and detachably secured thereto, said main portion having two bosses diametrically opposed to each other, said bosses having alining longitudinal openings, a valve member consisting of an inlet nipple in threaded engagement with one boss and a sleeve carrying a plug for closing the valve, said sleeve being loosely mounted in the other boss, two collars loosely mounted on said sleeve, one bearing against a flange on the lower end of the sleeve and the other being loosely mounted in the other boss, a toggle lever having sharp bearing edges which bear in notches in the collars in opposed relation to each other, a rod connecting the hinged portion of said toggle and the central portion of the bellows diaphragm, whereby the toggle may be brought into parallel relation with the valve and exert a powerful but delicately adjustable pressure upon the valve.

24. In a mine breathing apparatus, a pressure regulator comprising a main cylindrical portion having an outlet and having an aperture and a bellows diaphragm closing said aperture, said diaphragm being coaxial with the main portion of the regulator and detachably secured thereto, said main portion having two bosses diametrically opposed to each other, said bosses having alining longitudinal openings, a valve member consisting of an inlet nipple in threaded engagement with one boss and a sleeve carrying a plug for closing the valve, said sleeve being loosely mounted in the other boss, two collars loosely mounted on said sleeve, one bearing against a flange on the lower end of the sleeve and the other being loosely mounted in the other boss, a toggle lever having sharp bearing edges which bear in notches in the collars in opposed relation to each other, a rod connecting the hinged portion of said toggle and the central portion of the bellows diaphragm and a spring opposing the action of the bellows, whereby the toggle may be brought into parallel relation with the valve and exert a powerful but delicately adjustable pressure upon the valve.

In witness whereof I have hereunto set my hand.

WILLIAM E. GIBBS.